US010726745B2

(12) United States Patent
Zavesky et al.

(10) Patent No.: US 10,726,745 B2
(45) Date of Patent: Jul. 28, 2020

(54) AUTONOMOUS MULTI-PASS DATA ACQUISITION USING UNMANNED AERIAL VEHICLES

(71) Applicant: AT&T Intellectual Property I, L.P., Atlanta, GA (US)

(72) Inventors: Eric Zavesky, Austin, TX (US); Lee Begeja, Gillette, NJ (US); David Crawford Gibbon, Lincroft, NJ (US); Paul Triantafyllou, Watchung, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 242 days.

(21) Appl. No.: 15/621,210

(22) Filed: Jun. 13, 2017

(65) Prior Publication Data

US 2018/0357932 A1 Dec. 13, 2018

(51) Int. Cl.

*G01V 3/38* (2006.01)
*G09B 29/00* (2006.01)
*B64C 39/02* (2006.01)
*G01V 11/00* (2006.01)
*G06T 17/05* (2011.01)

(52) U.S. Cl.

CPC ............ *G09B 29/007* (2013.01); *B64C 39/02* (2013.01); *G01V 11/00* (2013.01); *G01V 11/002* (2013.01); *G06T 17/05* (2013.01); *B64C 2201/123* (2013.01)

(58) Field of Classification Search

None

See application file for complete search history.

(56) References Cited

U.S. PATENT DOCUMENTS 8,423,224 B1 * 4/2013 Fuciarelli ................. G06N 5/02 701/23
8,913,783 B2 12/2014 Khan et al.
9,417,325 B1 8/2016 Bry et al.
9,639,960 B1 5/2017 Loveland et al.

(Continued)

OTHER PUBLICATIONS

"Jeff Foster, an expert in 3D modeling, shares his best practices for capturing and processing drone imagery in DroneDeploy", http://resources.dronedeploy.com/blog/4-steps-to-making-a-3d-model-with-drone-imagery.

(Continued)

*Primary Examiner* — Aditya S Bhat

(74) *Attorney, Agent, or Firm* — Haynes and Boone, LLP

(57) ABSTRACT

In one example, the present disclosure describes a device, computer-readable medium, and method for performing autonomous multi-pass data acquisition using unmanned aerial vehicle. For instance, in one example, a method includes obtaining a first set of sensor data collected by a fleet of unmanned aerial vehicles comprising at least one unmanned aerial vehicle, wherein the first set of sensor data depicts a target area at a first granularity, constructing a three-dimensional map of hierarchical unit representations of the first set of sensor data, sending a signal to the fleet of unmanned aerial vehicles to obtain a second set of sensor data at a second granularity that is finer than the first granularity, based at least in part on an examination of the three-dimensional map, and aggregating the second set of sensor data to form a high-resolution composite of the target area.

20 Claims, 4 Drawing Sheets

(56) References Cited

U.S. PATENT DOCUMENTS

| | | | | |
|---|---|---|---|---|
| 2014/0163781 | A1* | 6/2014 | Vian | A01G 23/00 701/3 |
| 2014/0249693 | A1* | 9/2014 | Stark | B64C 39/024 701/2 |
| 2016/0004795 | A1 | 1/2016 | Novak | |
| 2016/0035224 | A1 | 2/2016 | Yang et al. | |
| 2016/0070265 | A1* | 3/2016 | Liu | G01C 21/00 701/3 |
| 2016/0097858 | A1 | 4/2016 | Mundhenk et al. | |
| 2017/0090271 | A1 | 3/2017 | Harris et al. | |
| 2017/0115376 | A1 | 4/2017 | Kim et al. | |
| 2017/0153116 | A1 | 6/2017 | Huang et al. | |

OTHER PUBLICATIONS

Dandois, Jonathan P., and Erie C. Ellis. "High spatial resolution three-dimensional mapping of vegetation spectral dynamics using computer vision." *Remote Sensing of Environment* 136 (2013): 259-276.

* cited by examiner

400

AUTONOMOUS MULTI-PASS DATA ACQUISITION USING UNMANNED AERIAL VEHICLES

The present disclosure relates generally to computer vision, and relates more particularly to devices, non-transitory computer-readable media, and methods for performing autonomous multi-pass data acquisition using unmanned aerial vehicles.

BACKGROUND

Unmanned aerial vehicles (UAVs, also commonly referred to as "drones") are vehicles that may be remotely controlled or may be flown autonomously (e.g., using computer vision processes). Although previously used largely in a military context, in recent years, civilian use of UAVs has become more widespread. For instance, UAVs are often used to capture video for the purposes of surveillance, traffic and weather monitoring, personalization, biometrics, disaster assessment, and the like.

SUMMARY

In one example, the present disclosure describes a device, computer-readable medium, and method for performing autonomous multi-pass data acquisition using unmanned aerial vehicle. For instance, in one example, a method includes obtaining a first set of sensor data collected by a fleet of unmanned aerial vehicles comprising at least one unmanned aerial vehicle, wherein the first set of sensor data depicts a target area at a first granularity, constructing a three-dimensional map of hierarchical unit representations of the first set of sensor data, sending a signal to the fleet of unmanned aerial vehicles to obtain a second set of sensor data at a second granularity that is finer than the first granularity, based at least in part on an examination of the three-dimensional map, and aggregating the second set of sensor data to form a high-resolution composite of the target area.

In another example, a device includes a processor and a computer-readable medium storing instructions which, when executed by the processor, cause the processor to perform operations. The operations include obtaining a first set of sensor data collected by a fleet of unmanned aerial vehicles comprising at least one unmanned aerial vehicle, wherein the first set of sensor data depicts a target area at a first granularity, constructing a three-dimensional map of hierarchical unit representations of the first set of sensor data, sending a signal to the fleet of unmanned aerial vehicles to obtain a second set of sensor data at a second granularity that is finer than the first granularity, based at least in part on an examination of the three-dimensional map, and aggregating the second set of sensor data to form a high-resolution composite of the target area.

In another example, a non-transitory computer-readable storage medium stores instructions which, when executed by a processor, cause the processor to perform operations. The operations include obtaining a first set of sensor data collected by a fleet of unmanned aerial vehicles comprising at least one unmanned aerial vehicle, wherein the first set of sensor data depicts a target area at a first granularity, constructing a three-dimensional map of hierarchical unit representations of the first set of sensor data, sending a signal to the fleet of unmanned aerial vehicles to obtain a second set of sensor data at a second granularity that is finer than the first granularity, based at least in part on an examination of the three-dimensional map, and aggregating the second set of sensor data to form a high-resolution composite of the target area.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure perform autonomous multi-pass data acquisition using unmanned aerial vehicles (UAVs). As discussed above, UAVs are often used to capture video for the purposes of surveillance, traffic and weather monitoring, personalization, biometrics, disaster assessment, and the like. Some of these applications may require hundreds of hours of data acquisition in order to capture sufficient data. For instance, performing a detailed survey of an agricultural space, a potential build site, or a dense urban area may require the collection of a large amount of data. Other applications, such as the cataloguing of communications infrastructure (e.g., cell towers) for inspection and repair, may involve collecting data for items that pose little concern (e.g., undamaged towers) in the process of identifying the items that are of concern. In each of these applications, effective utilization of the UAV footage typically requires a highly skilled operator and/or exhaustive software-based exploration (and subsequent exhaustive processing) of a target area. This is particularly true when the physical limitations of the UAVs make it more challenging to efficiently obtain sufficient footage (e.g., fixed-wing UAVs lack maneuverability, while quad-rotor drones are capable of limited flight times and have limited payload capacities).

Examples of the present disclosure perform highly structured data acquisition using one or more UAVs to collect data in multiple passes over a target area. In one example, at least one UAV performs one or more passes over the target area in order to construct a coarse view of the target area. The view may comprise not only image data, but any other type of data that may be collected by sensor. The coarse view may be used, for example, to identify specific portions of the target area that may require a closer view, or to identify obstacles to avoid during lower passes of the UAV(s). Based on knowledge gained through construction of the coarse view, the UAV(s) may then perform additional passes over all or part of the target area, in order to construct finer-grained views of the target area. Examples of the present disclosure thus leverage advancements in UAV construction, battery capacity, and processing power to reduce the costs of maintaining a high-performance UAV fleet including at least one UAV.

Figure 1:
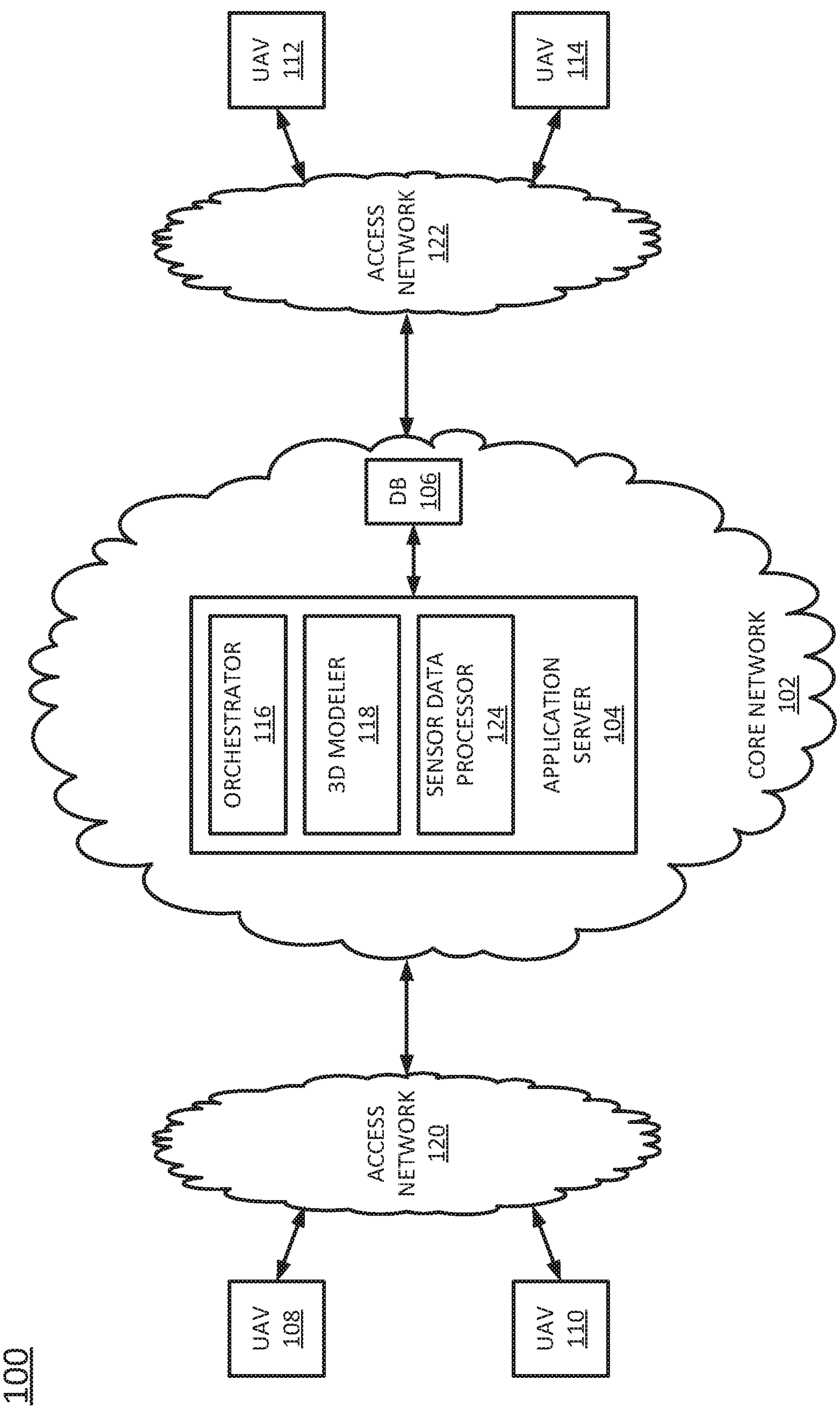
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more unmanned aerial vehicles (also referred to as "UAVs") 108 and 110, while the access network 122 may be in communication with one or more UAVs 112 and 114.

In one example, the UAVs 108, 110, 112, and 114 may be any type of mobile, unmanned aerial device configured for wireless communication, including fixed-wing vehicles, fixed-wing vertical take-off and landing (VTOL) hybrid vehicles, multi-rotor vehicles, single-rotor vehicles, and other types of UAVs. In a further example, any one or more of the UAVs 108, 110, 112, and 114 may also have wired communication and networking capabilities. In one example, at least some of the UAVs 108, 110, 112, and 114 include image capturing devices for capturing red, green, and blue (RGB) and/or thermal still and/or video images. In a further example, any one or more of the UAVs 108, 110, 112, and 114 may alternatively or additionally include another (e.g., non-visual) type of sensor, such as a moisture sensor, a magnetic field sensor, a temperature sensor, a location sensor (e.g., a global positioning system sensor), or another type of sensor. The UAVs 108, 110, 112, and 114 may collect data at multiple different granularities. It should be noted that although only four user UAVs are illustrated in FIG. 1, any number of UAVs may be deployed. Any of the UAVs 108, 110, 112, or 114 may comprise a general purpose computer that is configured to operate as a special purpose computer, as illustrated in FIG. 4 and discussed below.

In one example, the AS 104 may perform the methods discussed below related to performing autonomous multi-pass data acquisition using UAVs. For instance, in one example, the AS 104 hosts an application that communicates with one or more of the UAVs 108, 110, 112, and 114. As an example, the application may be a surveying application that maps a target area (e.g., a defined physical location) based on data captured by the UAVs 108, 110, 112, and 114. The application may further send signals to one or more of the UAVs 108, 110, 112, or 114 to adapt its flight path based on the data that the UAVs provide to the application.

Figure 4:
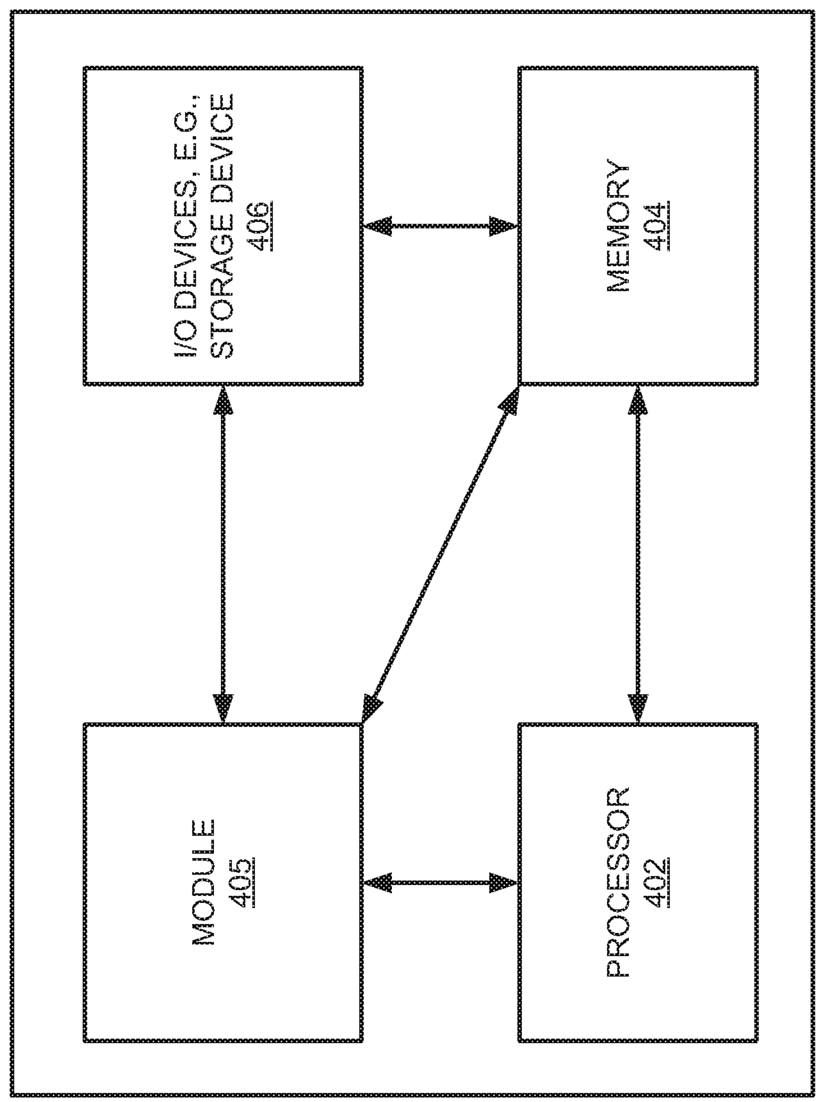
FIG. 4 depicts a high-level block diagram of a computing device specifically programmed to perform the functions described herein.

The AS 104 may comprise a general purpose computer as illustrated in FIG. 4 and discussed below. In one example, the AS 104 generally comprises an orchestrator 116, a three-dimensional (3D) modeler 118, and a sensor data processor 124. The orchestrator 116 and the 3D modeler 118 work together to generate a 3D map of hierarchical unit representations of the data captured by UAVs 108, 110, 112, and 114 (e.g., if the data is visual data, the unit representations may comprise volumetric pixels). The sensor data processor 124 may process the unit representations of data to produce priority scores that indicate which unit representations correspond to portions of the target area that could benefit most from additional data capture. Based on the priority scores, the orchestrator 116 may send signals to one or more of the UAVs 108, 110, 112, and 114 to adapt their flight paths so that more fine-grained data can be obtained for portions of the target area that are of particular interest.

In one example, the DB 106 may store data about the target area. The data stored in the DB 106 may include data captured by one or more of the UAVs 108, 110, 112, and 114, as well as data provided by other sources. For example, individual users may upload different types of data to the DB 106 to offer for use by the AS 104. The different types of data may include UAV sensor data collected by recreational UAV users and institutional UAV fleets (e.g., fleets used by various professional, emergency, and other organizations), as well as data obtained via means other than UAVs. In some examples, the users may be compensated for the use of their data (e.g., through exchange of data, monetary payment, or other means). Thus, the DB 106 may comprise all or a portion of a data exchange market. At least some of the data may be encrypted.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
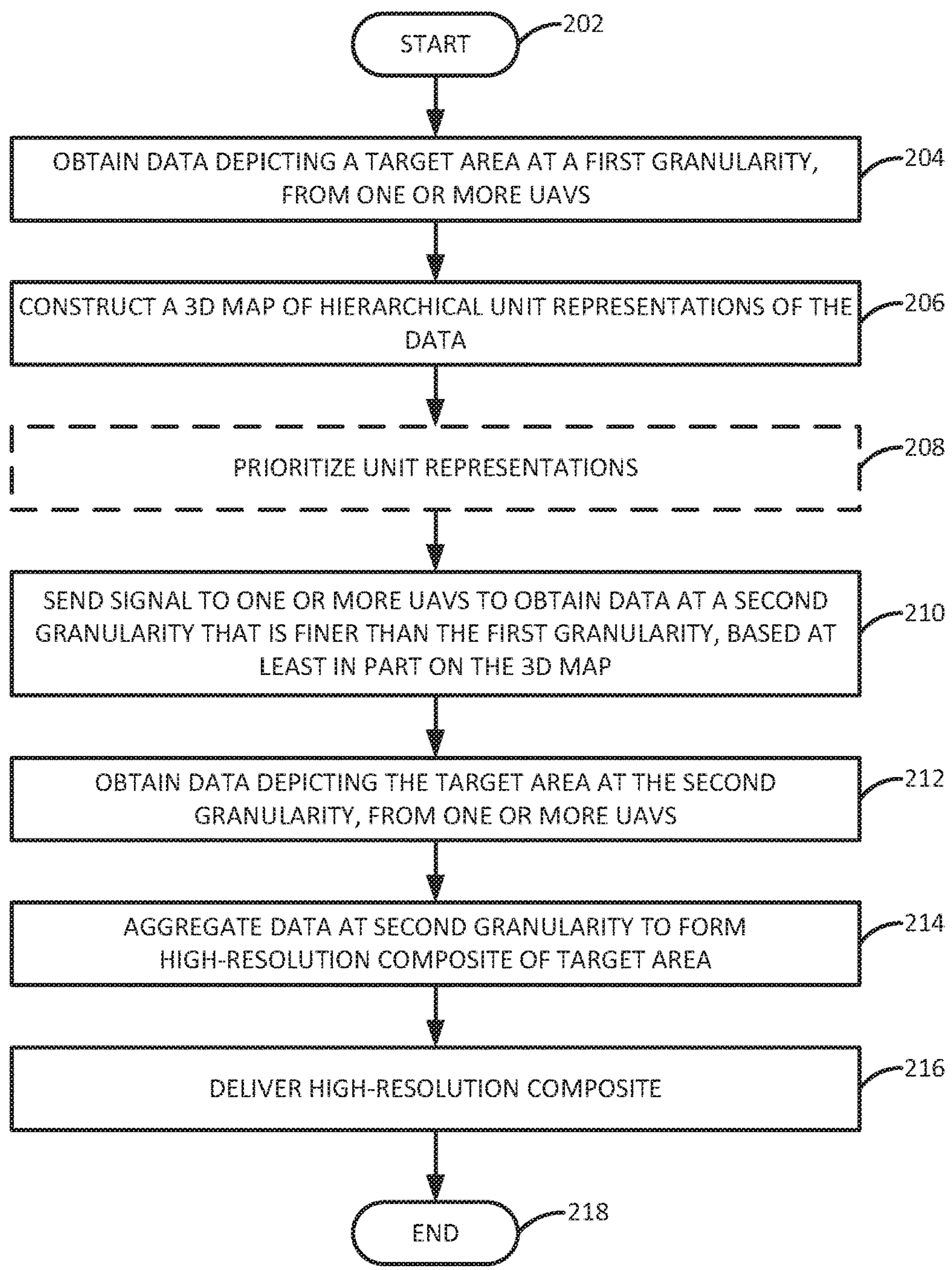
FIG. 2 illustrates a flowchart of a first example method for performing autonomous multi-pass data acquisition using unmanned aerial vehicles.

To further aid in understanding the present disclosure, FIG. 2 illustrates a flowchart of a first example method 200 for performing autonomous multi-pass data acquisition using unmanned aerial vehicles. In one example, at least some steps of the method 200 may be performed by an application server, such as the AS 104 of FIG. 1; however, any references in the discussion of the method 200 to the AS 104 of FIG. 1 or its components are not intended to limit the means by which the method 200 may be performed.

The method 200 begins in step 202. In step 204, a first set of data depicting a target area (e.g., a specific geographic location) is obtained at a first granularity, e.g., by the orchestrator 116 of the AS 104. The first set of data may be obtained directly from one or more UAVs, such as one or more of the UAVs 108, 110, 112, and 114. A portion of the first set of data may also be obtained from individual users (e.g., recreational UAV users and institutional UAV fleets, users of sensors and devices other than UAVs, and the like) who have uploaded different types of data to a database or data exchange market, e.g., the DB 106 of FIG. 1. In this case, the users may be compensated for the use of their data, as described above The first set of data may comprise still and/or video images (e.g., RGB and/or thermal images), moisture readings, magnetic field readings, temperature readings, geographic coordinates, and/or other types of data indicating a state or condition of the target area.

In step 206, a 3D map of hierarchical unit representations of the first set of data is constructed, e.g., by the 3D modeler 118 of the AS 104. For instance, if the first set of data comprises visual data (e.g., still and/or video images), then the unit representations of the first set of data may comprise volumetric pixels. The size of the unit representations may vary, where the smallest size may represent a native sample size (e.g., a 3×3×3 foot cube), and the largest size may be averaged among a plurality of samples (e.g., a 9×9×9 foot cube averaged from nine smaller cubes).

Figure 3:
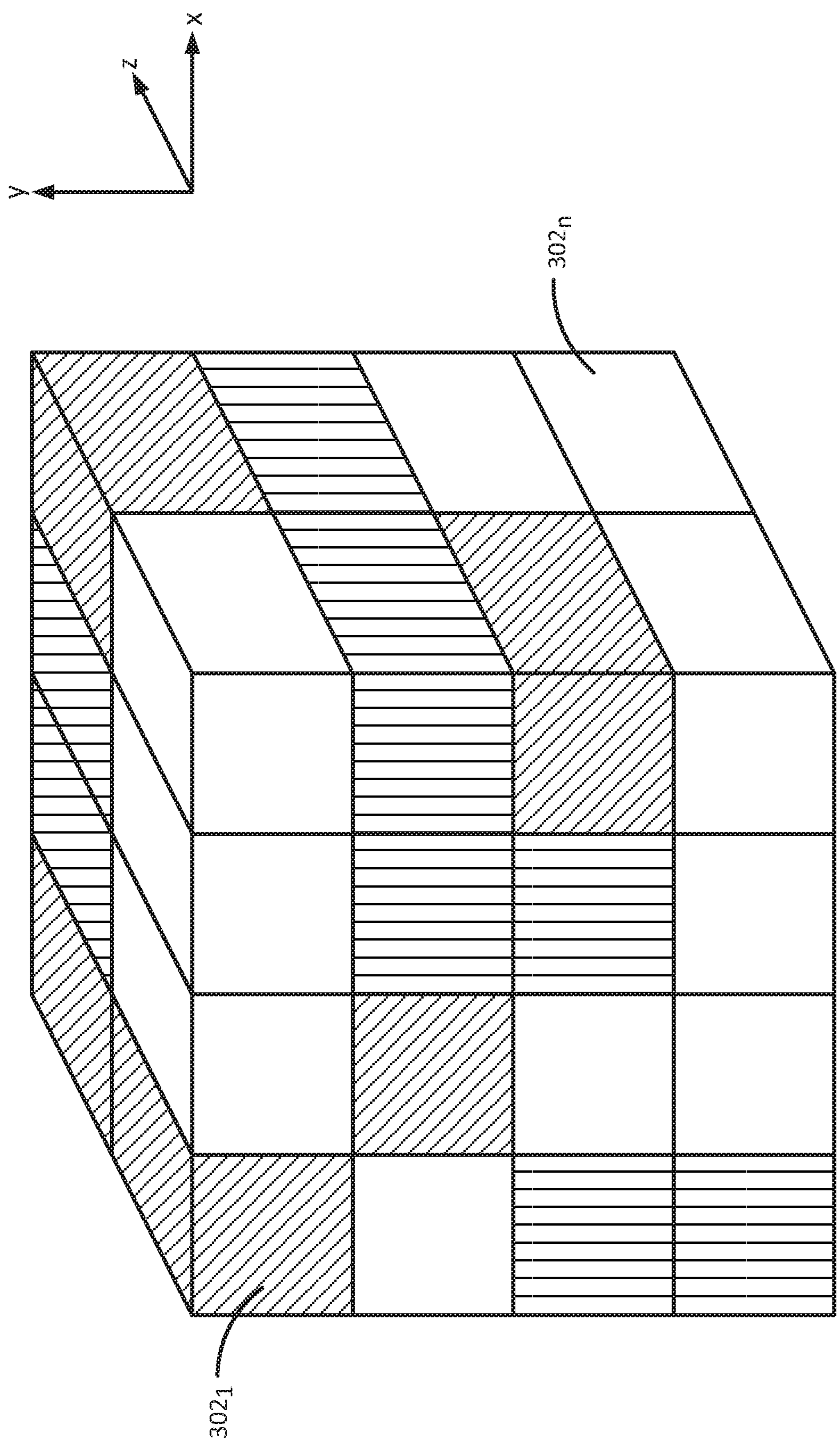
FIG. 3, for example, illustrates a portion of an example 3D map of a target area.

FIG. 3, for example, illustrates a portion of an example 3D map 300 of a target area. As illustrated, the 3D map 300 comprises a plurality of unit representations $\mathbf{302}_1$-$\mathbf{302}_n$ (hereinafter collectively referred to as "unit representations 302"), where each unit representation 302 represents some measurable parameter of the target area (e.g., image, temperature, moisture, magnetic field, etc.) in a three-dimensional (e.g., x, y, z coordinate) space. In one example, the size of the unit representations 302 may be user defined. The 3D map 300 may also include information derived from historical observations of the target area and/or related three-dimensional structures. In one example, the 3D map 300 may be supplemented with other data not obtained from the UAVs 108, 110, 112, and 114. For instance, different types of data uploaded to the DB 106 by various users may be used to supplement the 3D map 300.

In optional step 208 (illustrated in phantom), the unit representations contained in the 3D map may be prioritized, e.g., by the sensor data processor 124 of the AS 104. In one example, this step involves examining at least some of the unit representations and assigning priority scores to them, where the priority scores indicate the relative importance of the unit representations to the overall goal of the data acquisition process. For instance, if the goal of the data acquisition process is to identify sections of a crop that may be affected by a parasite infestation, then unit representations depicting anomalies or other indications of potential infestation may be assigned higher priority scores than unit representations depicting apparently healthy crops. Alternatively, if the goal of the data acquisition process is to survey the target area, then unit representations depicting potential obstacles (e.g., buildings, cell towers, equipment, etc.) may be assigned a higher priority score than other unit representations, so that the UAVs 108, 110, 112, and 114 can avoid collisions with the obstacles during subsequent passes over the target area. In one example, the priority scores may be supplemented with data from an external database, such as the DB 106 or a similar data exchange market. For instance, data uploaded by various users (e.g., historical images of the target area or other types of information about the target area) may help the sensor data processor 124 to identify when a particular unit representation may be deserving of a higher priority score. The users who uploaded the supplemental data may be compensated for use of the data as discussed above. In FIG. 3, the shading of the unit representations 302 indicates the relative priorities of the various unit representations 302 (e.g., where lower priority scores are indicated by lighter shading, and higher priority scores are indicated by darker shading).

In step 210, a signal is sent (e.g., by the orchestrator 116 of the AS 104) to at least one of the UAVs 108, 110, 112, and 114 to obtain a second set of data depicting the target area at a second granularity that is finer than the first granularity, based at least in part on the 3D map. The signal may identify specific portions of the target area, identified based in part on the 3D map, for which finer-grained data is desired. The signal may also alter the flight path for one or more of the UAVs (e.g., such that the flight path becomes linear, zig-zag, strictly vertical, arbitrary, or otherwise). For instance, if the 3D map shows a section of a crop that looks unusual (e.g., not like the other sections of the crop), then a more detailed view of that particular section of the crop may be helpful in determining whether something is wrong with that section of the crop (e.g., whether it is diseased). Alternatively, the signal may identify specific portions of the target area to be bypassed in subsequent passes by the UAVs 108, 110, 112, and 114, such as portions in which obstacles reside.

In one example, the identification of the specific portions of the target area may be further based on user input and/or on the priority scores assigned to the unit representations in step 208. For instance, if the goal of the data acquisition process is to find evidence of a particular condition (e.g., parasite infestation in crops or storm damage to buildings), then unit representations showing such evidence may be assigned higher priority scores as discussed above. In one example, when at least x instances of evidence have been identified (e.g., when x unit representations have been assigned a particular priority score), this may trigger a signal to acquire data at a higher resolution. The higher-resolution data acquisition may focus on the entire target area, or just the portions in which the evidence of the particular condition was detected. This avoids the need to scan the entire target area at high resolution until and unless sufficient evidence of the particular condition is found. Thus, in this case, the method 200 functions in a manner similar to a depth-first search.

In step 212, the second set of data depicting at least a portion of the target area is obtained at the second granularity, e.g., by the orchestrator 116 of the AS 104. The second set of data may be obtained directly from one or more of the UAVs 108, 110, 112, and 114. The second set of data may comprise still and/or video images (e.g., RGB and/or thermal images), moisture readings, magnetic field readings, temperature readings, geographic coordinates, and/or other types of data indicating a state or condition of the target area. In one example, the same UAVs are used to collect the first set of data at the first granularity and the second set of data at the second granularity. However, in another example, different UAVs are used to collect the first set of data and the second set of data. For instance, a first UAV with a low-resolution sensor may be used to collect the first set of data at the first granularity, while a second sensor with a high-resolution sensor is used to collect the second set of data at the second granularity.

In step 214, the second set of data depicting the target area at the second granularity is aggregated, e.g., by the 3D modeler of the AS 104, to form a high-resolution composite of the target area.

In optional step 216, the high-resolution composite of the target area is delivered to another application, such as an application that is configured to make a decision or to generate an alert based on review of the high-resolution composite. This may allow corrective actions to be taken in the target area, when necessary.

The method 200 ends in step 218.

Although the method 200 describes acquiring data in two passes of a UAV or plurality of UAVs, it is noted that any number of passes could be performed in order to obtain data at the desired granularity. For instance, steps 206-214 could be repeated as necessary to acquire data at gradually finer levels of granularity.

The method 200 may be implemented to perform at least two different variations of a multi-pass data acquisition. In one example, the method 200 is implemented as a temporal multi-pass technique. In this case, the data collected in the first pass of one or more UAVs generates a depiction of the target area at a coarse resolution. This depiction comprises spatial data that may be used, for example, for route planning. On subsequent passes of the UAV(s), higher-resolution data is obtained. Real-time analysis of the data captured by the UAV(s) in all passes may be used to drive control of the UAV(s) and sensors, and to make flight path decisions to optimize data capture. It is possible for the temporal multi-pass technique to be performed by a single UAV that makes multiple passes over the target area over time.

In another example, the method 200 is implemented as a spatial multi-pass technique. In this case, a plurality of UAVs fly in parallel (i.e., at the same time) over the target area, so that each UAV collects different data at the same time. For instance, each UAV may collect similar data (e.g., image data) about a different portion of the target area. Alternatively, each UAV may collect a different type of data about the target area (e.g., one UAV may collect image data, while another UAV collects temperature data). Each UAV may operate at a different resolution. However, data collected by one UAV may be used to optimize the flight path of other UAVs.

Furthermore, the granularity of the data acquired during each pass of the UAV(s) may be programmatically modified at any time based on a user command. For instance, responsive to a user command, granularity may be sacrificed (e.g., made coarser) for speed (e.g., completing a pass is a shorter period of time). Other factors that may affect the desired data granularity at a given time include time of day, availability of light, perceived wind or humidity, and/or the definition of a user-specified area of interest (e.g., in which more detail is particularly valuable).

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 may be implemented as the system 400. For instance an application server could be implemented as illustrated in FIG. 4.

As depicted in FIG. 4, the system 400 comprises a hardware processor element 402, a memory 404, a module 405 for performing autonomous multi-pass data acquisition using unmanned aerial vehicles, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for r performing autonomous multi-pass data acquisition using unmanned aerial vehicles may include circuitry and/or logic for performing special purpose functions relating to collecting data, modeling a target area in three dimensions based on the data, identifying portions of the target area for finer grained data acquisition, and adapting the flights paths of UAVs. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for performing autonomous multi-pass data acquisition using unmanned aerial vehicles (e.g., a software program comprising computer-executable instructions) can be loaded into memory 404 and executed by hardware processor element 402 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for performing autonomous multi-pass data acquisition using unmanned aerial vehicles (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:

obtaining a first set of sensor data collected by a first fleet that comprises at least one unmanned aerial vehicle, wherein the first set of sensor data represents a target area at a first granularity;

constructing a three-dimensional map that includes a plurality of unit representations of the first set of sensor data, wherein each unit representation is assigned a priority based on the sensor data of the first set of sensor data that the unit representation represents and a goal concerning the target area;

sending a signal that is generated based at least in part on at least one unit representation of the plurality of unit representations from the three-dimensional map and the priority assigned to the at least one unit representation of the plurality of unit representations to a second fleet that comprises at least one unmanned aerial vehicle to obtain a second set of sensor data at a second granularity that is finer than the first granularity, wherein the second set of sensor data is obtained from at least a portion of the target area represented by one or more unit representations of the plurality of unit representations that have a priority that satisfies a priority condition; and aggregating the second set of sensor data with the first set of sensor data to form a high-resolution composite of the target area.

2. The method of claim 1, wherein the first set of sensor data comprises images of the target area.

3. The method of claim 1, wherein the first set of sensor data comprises moisture readings of the target area.

4. The method of claim 1, wherein the first set of sensor data comprises temperature readings of the target area.

5. The method of claim 1, wherein the first set of sensor data comprises magnetic field readings of the target area.

6. The method of claim 1, wherein the first set of sensor data comprises geographic coordinates of the target area.

7. The method of claim 1, wherein a size of the unit representations is user defined.

8. The method of claim 1, wherein the three-dimensional map is supplemented with data obtained from a source other than the first fleet and the second fleet.

9. The method of claim 8, wherein the source is compensated for the data via a data exchange market.

10. The method of claim 1, wherein the three-dimensional map is supplemented with historical data relating to the target area.

11. The method of claim 1, wherein the generation of the signal comprises:

identifying the at least the portion of the target area for which data at the second granularity is desired.

12. The method of claim 1, wherein the priority condition includes at least one of the unit representations having a priority score that is high relative to priority scores corresponding to others of the unit representations.

13. The method of claim 12, wherein the signal that is generated based at least in part on the at least one unit representation of the plurality of unit representations from the three-dimensional map and each priority assigned to the at least one unit representation of the plurality of unit representations identifies at least a portion of the target area represented by the at least one unit represention of the plurality of unit representations having the priority score that indicates avoidance of that portion of the target area.

14. The method of claim 1, wherein the signal alters a flight path of the at least one unmanned aerial vehicle.

15. The method of claim 1, wherein each the first fleet and the second fleet comprise a plurality of unmanned aerial vehicles.

16. The method of claim 15, wherein the plurality of unmanned aerial vehicles include a plurality of different types of sensors.

17. The method of claim 16, wherein the first set of sensor data is collected using a first subset of the plurality of unmanned aerial vehicles including a first type of sensor, and wherein the second set of sensor data is collected using a second subset of the plurality of unmanned aerial vehicles including a second type of sensor.

18. The method of claim 17, wherein the first fleet and the second fleet are the same fleet of at least one unmanned aerial vehicle.

19. A device, comprising:

a processor; and a computer-readable medium storing instructions which, when executed by the processor, cause the processor to perform operations comprising:

obtaining a first set of sensor data collected by a first fleet that comprises at least one unmanned aerial vehicle, wherein the first set of sensor data represents a target area at a first granularity;

constructing a three-dimensional map that includes a plurality of unit representations of the first set of sensor data, wherein each unit representation is assigned a priority based on the sensor data of the first set of sensor data that the unit representation represents and a goal concerning the target area;

sending a signal that is generated based at least in part on at least one unit representation of the plurality of unit representations from the three-dimensional map and the priority assigned to the at least one unit representation of the plurality of unit representations to a second fleet that comprises at least one unmanned aerial vehicle to obtain a second set of sensor data at a second granularity that is finer than the first granularity, wherein the second set of sensor data is obtained from at least a portion of the target area represented by one or more unit representations of the plurality of unit representations that have a priority that satisfies a priority condition; and aggregating the second set of sensor data with the first set of sensor data to form a high-resolution composite of the target area.

20. A non-transitory computer-readable storage medium storing instructions which, when executed by a processor, cause the processor to perform operations, the operations comprising:

obtaining a first set of sensor data collected by a first fleet that comprises at least one unmanned aerial vehicle, wherein the first set of sensor data represents a target area at a first granularity;

constructing a three-dimensional map that includes a plurality of unit representations of the first set of sensor data, wherein each unit representation is assigned a priority based on the sensor data of the first set of sensor data that the unit representation represents and a goal concerning the target area;

sending a signal that is generated based at least in part on at least one unit representation of the plurality of unit representations from the three-dimensional map and the priority assigned to the at least one unit representation of the plurality of unit representations to a second fleet that comprises at least one unmanned aerial vehicle to obtain a second set of sensor data at a second granularity that is finer than the first granularity, wherein the second set of sensor data is obtained from at least a portion of the target area represented by one or more unit representations of the plurality of unit representations that have a priority that satisfies a priority condition; and aggregating the second set of sensor data with the first set of sensor data to form a high-resolution composite of the target area.

* * * * *